US011749135B2

(12) United States Patent
Chen et al.

(10) Patent No.: US 11,749,135 B2
(45) Date of Patent: Sep. 5, 2023

(54) SECURE COMPUTER-IMPLEMENTED EXECUTION AND EVALUATION OF PROGRAMMING ASSIGNMENTS FOR ON DEMAND COURSES

(71) Applicant: COURSERA, INC., Mountain View, CA (US)

(72) Inventors: Shuang Chen, San Jose, CA (US); Brennan Saeta, Menlo Park, CA (US); Marius Dragus, Zurich (CH); Mantas Matelis, Richmond Hill (CA)

(73) Assignee: Coursera, Inc., Mountain View, CA (US)

( * ) Notice: Subject to any disclaimer, the term of this patent is extended or adjusted under 35 U.S.C. 154(b) by 0 days.

(21) Appl. No.: 17/808,416

(22) Filed: Jun. 23, 2022

(65) Prior Publication Data

US 2022/0327955 A1 Oct. 13, 2022

Related U.S. Application Data

(62) Division of application No. 16/270,098, filed on Feb. 7, 2019, now Pat. No. 11,398,163, which is a division
(Continued)

(51) Int. Cl.
*G09B 19/00* (2006.01)
*G06Q 10/10* (2023.01)
(Continued)

(52) U.S. Cl.
CPC ....... *G09B 19/0053* (2013.01); *G06Q 10/103* (2013.01); *G06Q 50/20* (2013.01); *G09B 5/02* (2013.01); *G09B 7/02* (2013.01)

(58) Field of Classification Search
CPC ........ G09B 5/02; G09B 7/02; G09B 19/0053; G06F 8/43; G06F 11/00; G06F 11/36
See application file for complete search history.

(56) References Cited

U.S. PATENT DOCUMENTS

2003/0130021 A1\* 7/2003 Lydon .................... G06Q 40/04
463/9
2003/0131337 A1\* 7/2003 Perumainar ........ G09B 19/0053
717/100
(Continued)

OTHER PUBLICATIONS

International Search Report and Written Opinion for PCT Application PCT/US2016/014101, dated Jun. 7, 2016, 9 pages.
(Continued)

*Primary Examiner* — Peter R Egloff
(74) *Attorney, Agent, or Firm* — Brake Hughes Bellermann LLP

(57) ABSTRACT

A computer system includes a course repository and a server. The course repository includes a video of an online course, an instructor provided output for a programming assignment associated with the online course, and a submission script for generating student provided output for the programming assignment. The server includes a submission module that receives and verifies the student provided output for the programming assignment. The server further includes one or more built-in grader applications that compare the student provided output with the instructor provided output to determine a grade for the programming assignment.

20 Claims, 8 Drawing Sheets

Related U.S. Application Data of application No. 14/877,854, filed on Oct. 7, 2015, now Pat. No. 10,229,612.

(51) Int. Cl.
*G06Q 50/20* (2012.01)
*G09B 5/02* (2006.01)
*G09B 7/02* (2006.01)

(56) References Cited

U.S. PATENT DOCUMENTS

| | | |
|---|---|---|
| 2004/0260940 A1 | 12/2004 | Berg et al. |
| 2005/0272024 A1 | 12/2005 | Ullman et al. |
| 2008/0046860 A1* | 2/2008 | Kratschmer .......... G06F 11/008 717/101 |
| 2009/0217246 A1 | 8/2009 | Kondur et al. |
| 2010/0083240 A1 | 4/2010 | Siman et al. |
| 2013/0236860 A1 | 9/2013 | Dewan |
| 2013/0347131 A1 | 12/2013 | Mooring et al. |
| 2014/0113257 A1 | 4/2014 | Spiridonov et al. |
| 2014/0287397 A1 | 9/2014 | Chong et al. |
| 2016/0111018 A1* | 4/2016 | Sousa ....................... G06F 8/33 434/118 |

OTHER PUBLICATIONS

""Amazon EC2 Container Service"", "Amazon EC2 Container Service", Amazon Web Services (https//aws.amazon.com/ecs/), printed Sep. 25, 2015, 6 pages, 6 pages.
""Kubernetes"", "Kubernetes", Google (http://kubernetes.io/), printed Sep. 25, 2015, 9 pages, 9 pages.
"Apache Mesos", "Apache Mesos", Wikipedia (https://en.wikipedia.org/wiki/Apache_Mesos), printed Sep. 25, 2015, 4 pages, 4 pages.
U.S. Appl. No. 14/877,854, filed Oct. 7, 2015, Patented.
U.S. Appl. No. 16/270,098, filed Feb. 7, 2019, Allowed.

* cited by examiner

Upload Files and Submit

To upload a file, click the part below. Then, submit the files. You can submit as many times as you like. You do not need to upload all parts in order to submit.

| | |
|---|---|
| 1-Layer 2-Point Unit-Cost Routing (bench1) 25 points |  |
| 1-Layer 2-Point Bend-Penalty Non-Unit-Cost Routing (bench2) 25 points | |
| No Via 2-Layer 2-Point (bench3) 20 points | |

FIG. 3

How to submit

Copy the token below and run the submission script included in the assignment download. When prompted, use your email address jane@learner.com Shsc24BmBE44Z23N

402

Your submission token is unique to you and should not be shared with anyone. You may submit as many times as you like.

| Instructions | My submission | | | Discussions |
|---|---|---|---|---|
| +Create submission | | | | |

Your Submissions

| Date | | Score | Passed? | |
|---|---|---|---|---|
| ✓ 15 June 2015 at 1:35 PM | | 25/125 | No | |
| URP Part 1 (small) | | 10/10 | Show grader output | |
| URP Part 2 (medium) | | 15/15 | Show grader output | |

| Instructions | My submission | Discussions |
|---|---|---|
| Your submission is being graded.<br>When your grade is ready, this page will automatically refresh and your submission will appear below. | | |

FIG. 6

SECURE COMPUTER-IMPLEMENTED EXECUTION AND EVALUATION OF PROGRAMMING ASSIGNMENTS FOR ON DEMAND COURSES

CROSS-REFERENCE TO RELATED APPLICATION

This application is a divisional of U.S. patent application Ser. No. 16/270,098, filed on Feb. 7, 2019, which is a divisional of U.S. patent application Ser. No. 14/877,854, filed on Oct. 17, 2015, entitled "SECURE COMPUTER-IMPLEMENTED EXECUTION AND EVALUATION OF PROGRAMMING ASSIGNMENTS FOR ON DEMAND COURSES" (now U.S. Pat. No. 10,229,612), all of which are incorporated by reference herein in their entireties.

TECHNICAL FIELD

This description generally relates to the secure execution of code and/or evaluation of answers and results included in programming assignments for on-line courses.

BACKGROUND

An on-line course can require students to generate and submit programming assignments or projects as part of the course curriculum. Programming assignments can allow for more complex inputs than, for example, standard type quizzes and/or tests. For example, a programming assignment can include programming code (computer code or software) and datasets. In another example, a programming assignment can include software that produces a specific formatted output and results. Examples of programming assignments can include, but are not limited to, computer science projects, statistics projects that use computer programs and code for statistical computing and graphics to analyze data (e.g., statistics projects implemented using R), and finance or business projects that use spreadsheets or other computational programs for analyzing and processing data.

In some implementations, a student can enroll in an online course in an on demand basis allowing the student to select when they want to take the course and, in some cases, the duration of the course. In these cases, a student is not limited to a fixed time for the offering and duration of the on line course. On demand grading of programming assignments can be challenging, especially in an on demand course case, because the assignment grader needs to be available essentially on a twenty-four hour, seven day a week, 365 days a year basis. An on line course provider needs to have the tools available for the grading of the programming assignments available to a student in a real-time, on demand basis in order to provide real-time feedback (e.g., a grade) to the student. Dependent on the course content, for example, a student can run the programming assignment locally on the student's computer and then submit the output of the programming assignment (e.g., numeric values, numeric ranges, or numeric or text expressions) to be compared against instructor-provided expected output. In another example, a student can submit the programming assignment as a file to be evaluated (e.g., executed or run) by a custom instructor-provided grader.

SUMMARY

In one general aspect, a computer-implemented method can include receiving, by a computer system, code for a custom grader application, creating, by the computer system, a base custom grader container including the code for the custom grader application, associating the base custom grader container with an online course included in a repository included in the computer system, evaluating, by the computer system, the base custom grader container by executing the custom grader application in the base custom grader container, determining that the custom grader application violates a predetermined criterion, modifying the base custom grader container to prevent the executing of the custom grader application from violating the predetermined criterion, and storing, in the repository and in association with the online course, the modified base custom grader container including the custom grader application as a custom grader container image.

Implementations may include one or more of the following features. For example, the method can further include receiving, by the computer system, a programming assignment for the online course for grading, accessing the custom grader container image associated with the online course, using the custom grader container image as a basis for a custom grader container for grading the programming assignment, inputting the programming assignment to the custom grader container, executing the programming assignment by the custom grader application included the custom grader container, and determining a grade for the programming assignment based on an output of the execution of the programming assignment by the custom grader application. The predetermined criterion can be one of a plurality of security criteria. The plurality of security criteria can include a user privilege access level, and a specified user identification (ID). The predetermined criterion can be one of a plurality of network access criteria. The predetermined criterion can be a file system quota. The predetermined criterion can be a file access permission. The predetermined criterion can be a maximum duration for the executing of the custom grader application.

In another general aspect, a system can include a course repository. The course repository can include a video of the online course, instructor provided output for a programming assignment associated with the online course, and a submission script for generating student provided output for the programming assignment. The computer system can include a server. The server can include a submission module. The submission module can be configured to receive the student provided output for the programming assignment generated by the submission script, and verify the student provided output for the programming assignment. The server can include one or more built-in grader applications. The one or more built-in grader applications can be configured to compare the student provided output for the programming assignment to the instructor provided output for the programming assignment, and generate a grade for the programming assignment based on the comparison.

Implementations may include one or more of the following features. For example, the server can be configured to provide the submission script to a computing device for execution in a local application included in the computing device. The received student provided output for the programming assignment generated by the submission script can be received from the computing device. Verifying the student provided output for the programming assignment can include determining that contents of the student provided output for the programming assignment are in a proper format and include an expected type of content for evaluation by the one or more built-in grader applications. The one or more built-in grader applications can include a numeric grader application and an expression grader application. The built-in grader application can be a numeric grader application. Comparing the received student provided output for the programming assignment to the instructor provided output for the programming assignment can include comparing numbers included in the student provided output for the programming assignment with numbers included in the instructor provided output for the programming assignment. The built-in grader application can be an expression grader application. Comparing the received student provided output for the programming assignment to the instructor provided output for the programming assignment can include comparing text strings included in the student provided output for the programming assignment with text strings included in the instructor provided output for the programming assignment.

In yet another general aspect, a non-transitory, machine-readable medium has instructions stored thereon. The instructions, when executed by a processor, can cause a computing system to receive code for a custom grader application, create a base custom grader container including the code for the custom grader application, associate the base custom grader container with an online course included in a repository included in the computer system, evaluate the base custom grader container by executing the custom grader application in the base custom grader container, determine that the custom grader application violates a predetermined criterion, modify the base custom grader container to prevent the executing of the custom grader application from violating the predetermined criterion, and store, in the repository and in association with the online course, the modified base custom grader container including the custom grader application as a custom grader container image.

Implementations may include one or more of the following features. For example, the instructions, when executed by the processor, can further cause the computing system to receive a programming assignment for the online course for grading, access the custom grader container image associated with the online course, use the custom grader container image as a basis for a custom grader container for grading the programming assignment, input the programming assignment to the custom grader container, execute the programming assignment by the custom grader application included the custom grader container, and determine a grade for the programming assignment based on an output of the execution of the programming assignment by the custom grader application. The predetermined criterion can be one of a plurality of security criteria or one of a plurality of network access criteria. The predetermined criterion can be a maximum duration for the executing of the custom grader application or a file access permission. The predetermined criterion can be a security criteria including a user privilege access level. The predetermined criterion can be a security criteria including a specified user identification (ID).

The details of one or more implementations are set forth in the accompanying drawings and the description below. Other features will be apparent from the description and drawings, and from the claims.

BRIEF DESCRIPTION OF THE DRAWINGS

FIG. 3 shows an example user interface for submitting a programming assignment for grading using a web-based interface.

FIG. 4 shows an example user interface for submitting a programming assignment for grading using a submission script.

FIG. 5 shows an example user interface of a submission page that provides feedback on a programming assignment submitted by a student for custom grading.

FIG. 6 shows an example user interface of a submission page that provides feedback on a programming assignment submitted by a student to a built-in grader application.

Like reference symbols in the various drawings indicate like elements.

DETAILED DESCRIPTION

Figure 1:
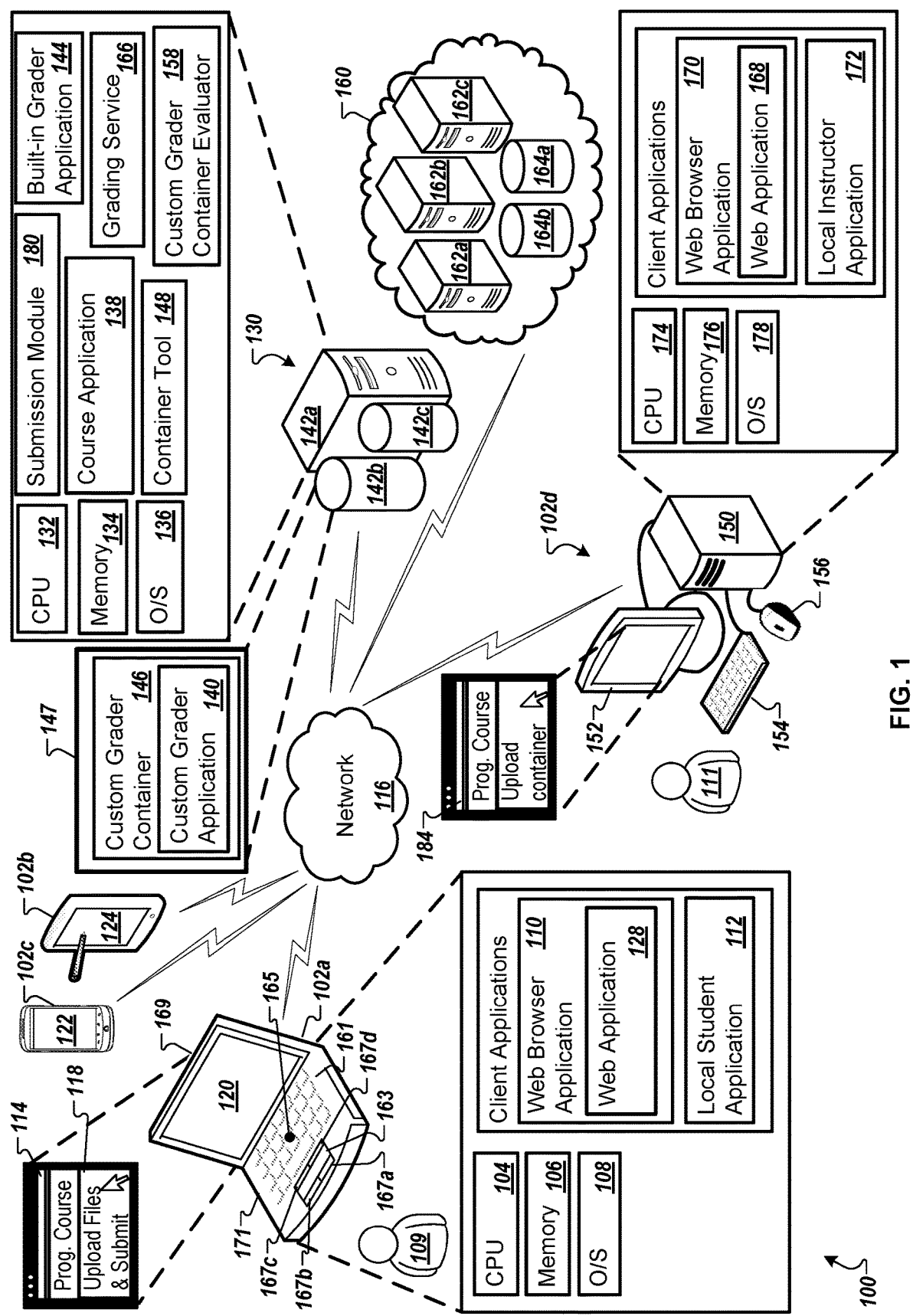
FIG. 1 is a diagram of an example system 100 that can be used to containerize a programming assignment.

A programming assignment for an on demand online course can be represented as a file or item in a computer system. The programming assignment can include software or code written by a student. There can be different types of programming assignments. In some implementations, in a first type of programming assignment, a student can run or execute the programming assignment on a local computer system (e.g., a student's laptop computer). The output of the executed code can include, for example, one or more of numeric values, numeric ranges, and/or numeric or character expressions. The student can submit the executed code output as an item or file for evaluation by instructor-provided numeric values, numeric ranges, and/or numeric or character expressions that represent the correct output.

In some implementations, in a second type of programming assignment, a student can submit the programming assignment as an item or file for evaluation by a custom instructor-provided grader.

In some implementations, how a student submits the programming assignment for evaluation can vary based not only on the assignment but also on the online course. Referring to the first type of programming assignment and the second type of programming assignment described above, a universal submission system can incorporate a single submission model independent of the programming assignment type and the online course. This would allow the submission flow of a programming assignment to be the same across different programming assignment types. The single submission model can containerize the programming assignment, making it easier for the student to submit the programming assignment and for the grading system to grade the programming assignment.

Containerizing programming assignments can provide real-time results to the student while meeting the requirements of course instructors. Containerizing programming assignments can also provide necessary programming assignment security. The containerized programming assignment infrastructure can isolate each student's programming assignment submission ensuring that a first student's programming assignment submission will not affect the evaluation of a second student's programming assignment submission. The isolation of the programming assignments is accomplished by the containerized programming assignment infrastructure being able to ensure that the first student's programming assignment submission will not affect or influence the score, the feedback, or the time it takes to evaluate the second student's programming assignment submission.

In addition, the implementations of the containerization of the programming assignments can isolate and not permit any behavior that may be considered malicious. A bounded computer system can run (execute) a containerized programming assignment. The containerized programming assignment can have restricted system privileges and may not have the ability to escalate those privileges while executing. The containerized programming assignment can run (execute) with minimal access to system resources reducing the available attack surface. The containerized programming assignment may be granted no or minimal guarded network access.

FIG. 1 is a diagram of an example system 100 that can be used to containerize a programming assignment. The example system 100 includes a plurality of computing devices 102a-d (e.g., a laptop or notebook computer, a tablet computer, a smartphone, and a desktop computer, respectively). The computing devices 102a-d shown in FIG. 1 merely represent types of computing devices that a student and/or an instructor can use when interacting with or providing input to or content for an online course.

For example, a student (e.g., student 109) can use any or all of the computing devices 102a-d to access and interact with an online course. For example, the student 109 can use a computing device 102d when in a library or office. The student 109 can use a computing device 102a when in their residence. The student can use a computing device 102c or a computing device 102d when they are traveling or otherwise away from their residence. In a similar manner, an instructor 111 for an online course can use any or all of the computing devices 102a-d to access and provide information for the online course.

The example computing device 102a (e.g., a laptop or notebook computer) can include one or more processors (e.g., a client central processing unit (CPU) 104) and one or more memory devices (e.g., a client memory 106). The computing device 102a can execute a client operating system (O/S) 108 and one or more client applications, such as a web browser application 110. The web browser application 110 can display a user interface (UI) (e.g., a web browser UI 114) on a display device 120 included in the computing device 102a. The student 109 can interact with the web browser UI 114 to access an online course. The display device 120 can display a UI for the online course to the student 109.

The system 100 includes a computer system 130 that can include one or more computing devices (e.g., a server 142a) and one or more computer-readable storage devices (e.g., online course repository 142b and student repository 142c). The server 142a can include one or more processors (e.g., a server CPU 132), and one or more memory devices (e.g., a server memory 134). The computing devices 102a-d can communicate with the computer system 130 (and the computer system 130 can communicate with the computing devices 102a-d) using a network 116. The server 142a can execute a server O/S 136. The server 142a can provide online course content (e.g., online course videos) that can be included in (stored in) the online course repository 142b.

The server 142a can execute a course application 138 that can provide the content (e.g., a video) of an online course to the computing devices 102a-d using the network 116.

In some implementations, the computing devices 102a-d can be laptop or desktop computers, smartphones, personal digital assistants, tablet computers, or other appropriate computing devices that can communicate, using the network 116, with other computing devices or computer systems. In some implementations, the computing devices 102a-d can perform client-side operations, as discussed in further detail herein. Implementations and functions of the system 100 described herein with reference to computing device 102a, may also be applied to computing device 102b, computing device 102c, and computing device 102d and other computing devices not shown in FIG. 1 that may also be included in the system 100.

The computing device 102a includes the display device 120 included in a lid portion 169 and one or more input devices included in a base portion 171. The one or more input devices include a keyboard 161, a trackpad 163, a pointer button 165, and mouse buttons 167a-d. The computing device 102b includes a display area 124 that can be a touchscreen. The computing device 102c includes a display area 122 that can be a touchscreen. The computing device 102d can be a desktop computer system that includes a desktop computer 150, a display device 152 that can be a touchscreen, a keyboard 154, and a pointing device (e.g., a mouse 156). A user can interact with one or more input devices and/or a touchscreen to when accessing, viewing, and interacting with online course content.

In some implementations, the computer system 130 can represent more than one computing device working together to perform server-side operations. For example, though not shown in FIG. 1, the system 100 can include a computer system that includes multiple servers (computing devices) working together to perform server-side operations. In this example, a single proprietor can provide the multiple servers. In some cases, the one or more of the multiple servers can provide other functionalities for the proprietor.

In some implementations, the network 116 can be a public communications network (e.g., the Internet, cellular data network, dialup modems over a telephone network) or a private communications network (e.g., private LAN, leased lines). In some implementations, the computing devices 102a-d can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

In some implementations, the web browser application 110 can execute or interpret a web application 128 (e.g., a browser-based application). The web browser application 110 can include a dedicated user interface (e.g., the web browser UI 114). The web application 128 can include code written in a scripting language, such as AJAX, JavaScript, VB Script, ActionScript, or other scripting languages. The web application 128 can display a web page 118 in the web browser UI 114. The web page 118 can include a user interface that can allow the student 109 to upload and submit a programming assignment.

In a non-limiting example, the computing device 102a can receive a video of an online video course from the computer system 130. For example, the web application 128 can display in the web browser UI 114 one or more icons representative of (associated with) respective one or more courses for selection by a user of the computing device 102a. For example, the student 109 can select a course by placing a cursor on an icon. The student 109 can then select the icon (e.g., click a mouse button). The selection of the icon can launch the online course. When launched, the computer system 130 can provide the video of the online course. The display device 120 can display the visual content of the video of the online course and one or more speakers (not shown) included in the computing device 102a can play the audio portion of the online course. The course application 138 can retrieve the video of the online course from the online course repository 142b. The server 142a using the network 116 can provide the video to the computing device 102a.

The student 109 can interact with online course content that can also be displayed in the web browser UI 114. When ready to submit a programming assignment, the student 109 can access the web page 118 that allows the user to upload and submit the programming assignment. For example, the computing device 102a provides (uploads) the programming assignment to the computer system 130 using the network 116. In some implementations, the computer system 130 can store the programming assignment in the memory 134. In addition or in the alternative, the computer system 130 can store the programming assignment in the student repository 142c. For example, the student repository 142c can include information about the student 109 that can include but is not limited to past uploaded programming assignments, grades, and enrolled courses.

In some implementations, the student 109 can run (execute) the code for the programming assignment using a local student application 112. The student 109 can provide the results of the executed code (e.g., numerical values, numerical ranges, and/or numerical expressions) as a first type of programming assignment to the computer system 130 using the network 116. Built-in grader applications 144 included in the server 142a can grade the first type of programming assignment by comparing the results of the executed code of the programming assignment with predetermined correct results for the programming assignment provided by the instructor and stored, for example, in the online course repository 142b in association with the online course. Though shown as separate applications in the example system 100, the built-in grader applications 144 can be included as part of the course application 138.

In some implementations, the student 109 can submit a second type of programming assignment that includes code for execution by a custom grader application 140 included in a custom grader container 146. The custom grader application 140 can run (execute) the code included in the programming assignment within the constraints of the custom grader container 146 in a cloud computing environment 160 accessible by the server 142a. The custom grader application 140 and the custom grader container 146 can be stored as a custom grader container image 147 that can be the basis for a custom grader container 146 for each submitted programming assignment for grading by the custom grader application 140. The custom grader container image 147 can be stored in the course repository 142b in association with the online course. The server 142a can access the cloud computing environment 160 using the network 116. The cloud computing environment 160 can include a plurality of computing devices (e.g., servers 162a-c) and a plurality of repositories (e.g., repositories or databases 164a-b).

A submission module 180 can receive the uploaded programming assignment. The submission module 180 can check the programming assignment for completeness before submitting the programming assignment for grading.

An instructor 111 can use a computing device (e.g., the computing device 102d) included in the computing devices 102a-d to create the custom grader application 140. The example computing device 102d (e.g., a desktop computer) can include one or more processors (e.g., a client central processing unit (CPU) 174) and one or more memory devices (e.g., a client memory 176). The computing device 102a can execute a client operating system (O/S) 178 and one or more client applications, such as a web browser application 170. The web browser application 170 can display a user interface (UI) (e.g., a web browser UI 184) on the display device 152 included in the computing device 102d. The instructor 111 can interact with the web browser UI 184 to create the custom grader application 140. The custom grader application 140 can include code that a local instructor application 172 can compile and execute. The instructor 111 can provide test data to the custom grader application 140 to test and determine the proper functionality of the custom grader application 140.

The instructor 111 can access the container tool 148 in order to incorporate the custom grader application 140 into the custom grader container 146. The instructor 111 can provide the custom grader application 140 in the custom grader container 146 to the server 142a as a custom grader container image 147. The computing device 102d can upload the custom grader container image 147 to the computer system 130 using the network 116. The server 142a can store the custom grader container image 147 in the course repository 142b in association with the online course.

In some implementations, more than one (two or more) custom grader applications and respective custom grader containers can be associated with a single online course and stored in association with the single online course in the course repository 142b. In some implementations, more than one (two or more) built-in grader applications can be associated with a single online course and stored in association with the single online course in the course repository 142b.

A custom grader container evaluator 158 can evaluate the custom grader container 146 to ensure that running the custom grader application 140 in the custom grader container 146 does not violate any security or operating criteria. In cases where a security or operating violation is detected, the custom grader container evaluator 158 can modify and/or fine-tune the custom grader container 146 to avoid the occurrence of the identified security or operating violation. The modified custom grader container 146 can be stored in the course repository 142b in the custom grader container image 147 in association with the online course for future use as the basis for a custom grader for a programming assignment for the online course.

For example, the student 109 can submit a programming assignment for grading by a custom grader. The computing device 102a can upload the programming assignment to the server 142a using the network 116. A grading service 166 can access the custom grader container image 147 that includes the modified custom grader container 146. The grading service 166 can access the custom grader container image 147 from the course repository 142b. The grading service 166 can provide the programming assignment as input to the modified custom grader container 146. In addition, in some cases, the grading service 166 can provide additional constraints for executing the programming assignment in the modified custom grader container 146. The additional constraints can include, but are not limited to, a maximum run time for the execution and grading of the programming assignment and a maximum amount of system resources (e.g., memory, central processing unit (CPU)

usage) for use when executing and grading the programming assignment. The server 142a can provide the programming assignment, the custom grader container image 147 that includes the modified custom grader container 146, and the constraints to the cloud computing environment 160. The grading service 166 can schedule the running of (execution of) the code included in the programming assignment in the cloud computing environment 160. The running (execution) of the code included in the programming assignment will be performed within a container based on the custom grader container image 147 and within the constraints of the modified custom grader container 146.

Figure 2:
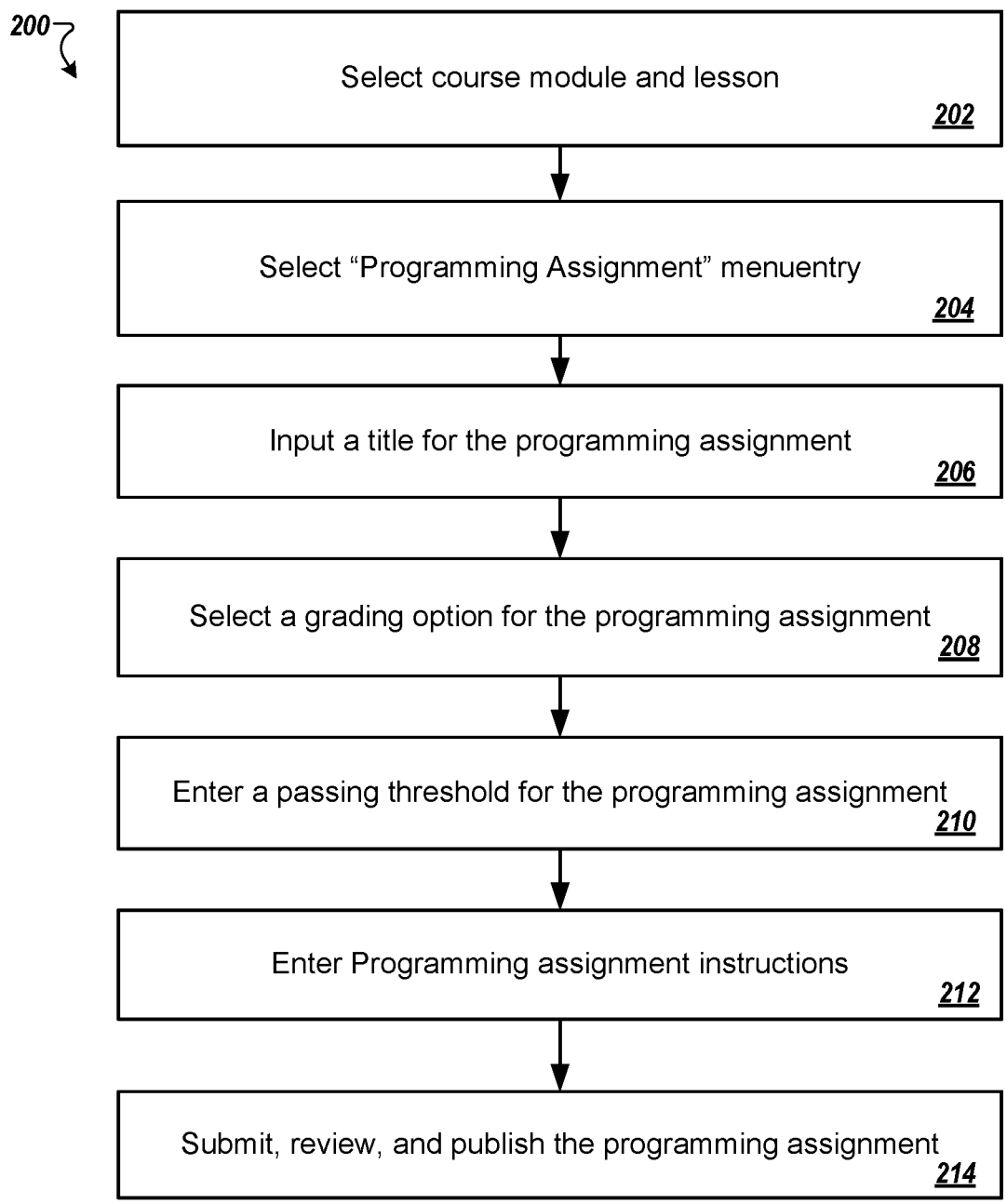
FIG. 2 is a flowchart that illustrates a method for creating a programming assignment by an instructor.

FIG. 2 is a flowchart that illustrates a method 200 for creating a programming assignment by an instructor. A student can perform the programming assignment in a development environment and submit the programming assignment for grading using the systems and methods described herein. As shown in FIG. 2, creating a programming assignment can be a multi-step process. Referring to FIG. 1, an instructor can create the programming assignment by performing some of the method steps on the server 142a and by performing some of the method steps locally on a development environment used by an instructor (e.g., the computing device 102d used by the instructor 111).

The method 200 begins with the instructor selecting the course module and lesson that the instructor wants to create a programming assignment for (block 202). The instructor selects a "Programming Assignment" menu entry to start the creation of a programming assignment for the selected course module and lesson (block 204).

The instructor inputs a title for the assignment (block 206). The instructor inputs the grading option (block 208). For example, referring to FIG. 1, the instructor inputs whether the programming assignment will be graded using a built-in grader application (e.g., the built-in grader application 144) or a custom grader (e.g., using the custom grader application 140 included in a custom grader container 146).

Referring to FIG. 1, for example, a second type of programming assignment can be graded by using the custom grader container 146 that includes a custom grader application 140. For example, the built-in grader application 144 can grade a second type of programming assignment. When submitting a second type of programming assignment, a student can run or execute the programming assignment on a local computer system (e.g., computing device 102a). The output of the executed code can include, for example, one or more of numeric values, numeric ranges, and/or numeric or character expressions. The student can submit the executed code output as an item or file for evaluation by instructor-provided numeric values, numeric ranges, and/or numeric or character expressions that represent the correct output.

The instructor enters a passing threshold for the assignment (block 210). For example, for a first type of programming assignment, the passing threshold can be a passing grade for the assignment or a number of correct answers for the assignment. For example, for the second type of programming assignment, a passing threshold can be the successful execution of the code included in the programming assignment.

The instructor enters instructions for the programming assignment (block 212). The instructor can enter one or more instruction parts for the programming assignment. For example, the instructor can enter the criteria for the programming assignment, the purpose of the programming assignment, and an expected outcome for the programming assignment. The instructor submits, reviews, and publishes the programming assignment (block 214). Once published, a student enrolled in the online course can access the programming assignment.

When accessing the programming assignment, a student may also access and use additional assets that can assist the student in performing the tasks needed for understanding and completing the programming assignment. For example, the student can download a starter file package. The starter file package can include sample code and/or detailed instructions that a student can use to get started on the programming assignment. The student can run or execute a submission script. Referring to FIG. 1, the execution of the submission script can submit the programming assignment from the development environment of the student (e.g., the computing device 102a) by uploading the programming assignment to a remote computer system (e.g., the computer system 130) for subsequent evaluation and grading. In some implementations, the submission script can be included in the starter file package for the programming assignment.

A programming assignment can include multiple parts including instructions for the assignment (instruction parts) and the assignment itself that can be provided in multiple parts (assignment parts). The instructions can explain what a student may need to do to complete the programming assignment. For example, the instructions can include a link to a downloadable package that can include further instructions and support code. Referring to FIG. 1, a student can download the package from the computer system 130 to a development system (e.g., the computing device 102a).

Each part of a programming assignment can be considered analogous to, for example, an individual question on a quiz, with each part representing a particular programming task. For example, a programming assignment to evaluate Boolean functions may include multiple parts with each part corresponding to progressively more complex functions. Each part of the multiple part programming assignment can be individually graded. All of the multiple parts of the assignment, however, are submitted together as a submission for the programming assignment. A student can choose to work on a programming assignment on a part-by-part basis, submitting completions of each of the multiple parts of the programming assignment separately for individual grading. The student can choose to submit more completed parts of the programming assignment with each successive submission until the student achieves a passing grade on the programming assignment.

As described, a programming assignment can include instruction parts and assignment parts. An instructor can identify each of the assignment parts of a programming assignment, assigning a title to the part, a number of points that can be awarded for a correct submission for the part of the programming assignment, and an associated filename for a file that includes the submission for the part of the programming assignment. For example, referring to FIG. 1, when a student submits a first type of programming assignment for grading by the built-in grader applications 144, the file that includes the submission for the part of the programming assignment can be referred to as a suggested file and can correspond to a starter file that a student can use for the corresponding part of the assignment. For example, referring to FIG. 1, when a student submits a second type of programming assignment for grading using the custom grader container 146, the file that includes the submission for the part of the programming assignment can be referred to as an expected file.

FIG. 3 shows an example user interface 300 for submitting a programming assignment for grading using a web-based interface. In some implementations, a student can submit a programming assignment for grading using the web-based interface. These implementations can be referred to as web submissions using a web submission model. Referring to FIG. 1, for example, a student can run or execute a web application (e.g., the web application 128) in the web browser application 110 on the computing device 102a. The web application 128 can display the web page 118 in the web browser UI 114. The web page 118 can include a user interface (e.g., the user interface 300) that can allow the student 109 to upload and submit each part of a programming assignment. The web browser application 110 included on the computing device 102a can be configured to use a proxy for the web submission. This allows for cases where a development environment included on the computing device 102a may not be able to be run in the web browser application 110, connected to the network 116, and/or interfaced with the computer system 130.

FIG. 4 shows an example user interface 400 for submitting a programming assignment for grading using a submission script. In some implementations, a student can submit a programming assignment for grading by running or executing a submission script on a development environment of the student. These implementations can be referred to as script submissions using a script submission model. For example, the submission script can be included in a starter file package for the programming assignment. The student can download the starter file package from a remote computer system (e.g., the computer system 130) to the development environment of the student (e.g., the computing device 102a). For example, the starter file package can be stored in the course repository 142b in association with an online course.

The use of a submission script when submitting a programming assignment for grading may be preferable for programming assignments in which a student writes code in a programming language whose development tools are included in the development environment of the student. For example, referring to FIG. 1, the local student application 112 included on the computing device 102a can include the development tools and environment for the programming assignment. Examples of development tools and environments can include, but are not limited to, a technical computing language such as Matlab, and a statistical computing language such as R.

A student can receive a submission token 402 (a submission password) for use when running (executing) a submission script. Referring to FIG. 1, for example, a script submission can be integrated with an edit-submit cycle of a development environment included locally on the computing device 102a (e.g., the local student application 112). The student can then easily submit the programming assignment as part of the development process included in the development environment. The script submission, however, does require the development of the inclusion of the submission flow in the development environment.

In some implementations, a programming assignment can include multiple assignment parts (a first assignment part and a second assignment part) of different assignment types. The first assignment part can be a first type of assignment for grading by a built-in grader as described herein. The second assignment part can be a second type of assignment for grading by a custom grader as described herein. A student needs to use the same submission model (e.g., a web submission model or a script submission model) for all parts of the programming assignment independent of the assignment type of the part of the assignment.

FIG. 5 shows an example user interface 500 of a submission page that provides feedback on a programming assignment submitted by a student for custom grading. For example, referring to FIG. 1, the student 109 can upload the code for the programming assignment to the computer system 130. The grading service 166 can access the custom grader container image 147 that includes the modified custom grader container 146 by accessing the course repository 142b. The custom grader container image 147 is associated with the programming assignment submitted by the student 109. The grading service 166 can provide the programming assignment as input to a custom grader container based on the custom grader container image 147. In addition, in some cases, the grading service 166 can provide additional constraints for executing the programming assignment in the modified custom grader container 146. The server 142a can provide the programming assignment, the custom grader container image 147, and the constraints to the cloud computing environment 160. The grading service 166 can schedule the running of (execution of) the code included in the programming assignment within the constraints of the modified custom grader container 146 in the cloud computing environment 160.

In an asynchronous manner, the student can receive a grade and feedback for the submitted programming assignment output that can be provided by the computer system 130 and to the computing device 102a using the network 116. The user interface 500 shows an example of what can be presented to the student 109 on the display device 120 subsequent to the student 109 uploading the output of the programming assignment to the computer system 130 for grading.

FIG. 6 shows an example user interface 600 of a submission page that provides feedback on a programming assignment submitted by a student to a built-in grader application. For example, referring to FIG. 1, when using the built-in grader applications 144 to evaluate and grade a programming assignment, the student 109 uploads the output of running or executing the programming assignment on the computing device 102a using the local student application 112. The output of the programming assignment can include numeric and/or regular expressions for evaluation and grading by the built-in grader applications 144. In a synchronous manner, the student can receive a grade and feedback for the submitted programming assignment output that can be provided by the computer system 130 and to the computing device 102a (the development environment of the student) using the network 116. The user interface 600 shows an example of what can be presented to the student 109 on the display device 120 subsequent to the student 109 uploading the output of the programming assignment to the computer system 130 for grading.

In some implementations, referring to FIG. 1, the built-in grader applications 144 can include a numeric built-in grader application and a regular expression built-in grader application. A student (e.g., the student 109) can run (execute) a programming assignment (or a part of a programming assignment) in a local student application (e.g., the local student application 112) or development environment. The student can submit the output of the running of the programming assignment by uploading the programming assignment output to the computer system 130 using the network 116. The built-in grader applications compare the output of the programming assignment to output provided by the instructor and stored in the course repository 142b in association with the online course and, in particular, in association with the particular programming assignment for the online course.

In some cases, for example, the output of the programming assignment can be a single line list of real numbers each number separated by at least one whitespace. In these cases, a numeric built-in grader application can match the output of the programming assignment provided by the student to the output provided by the instructor based on one or more conditions or criterion. In a synchronous manner, the student can receive a grade and feedback for the submitted programming assignment output that can be provided by the computer system 130 and to the computing device 102a (the development environment of the student) using the network 116.

Figure 7:
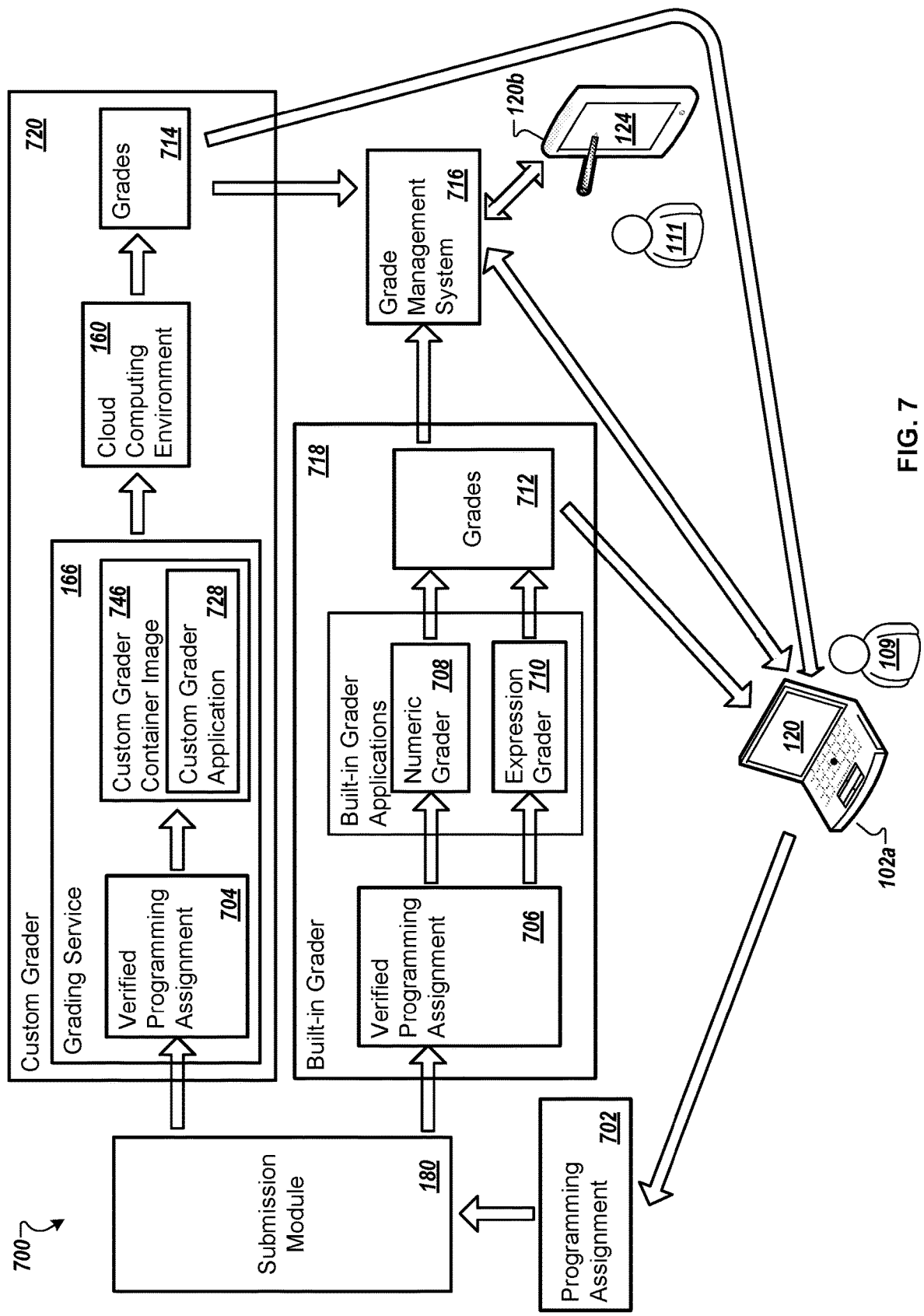
FIG. 7 is a block diagram showing a system flow for submitting programming assignments, grading programming assignments, and managing the grades for the programming assignments.

FIG. 7 is a block diagram showing a system flow 700 for submitting programming assignments, grading programming assignments, and managing the grades for the programming assignments. Referring also to FIG. 1, the student 109 using the computing device 102a can participate in an online course. In a first example, the student 109 can run (execute) the code for a programming assignment using a local student application 112. The student 109 can provide (upload) the results of the executed code (e.g., numerical values, numerical ranges, and/or numerical expressions) as programming assignment 702 to the submission module 180 included in the computer system 130 using the network 116. In this first example, the programming assignment 702 can be considered a first type of programming assignment. A built-in grader 718 can grade the first type of programming assignment.

The built-in grader 718 can include the built-in grader applications 144 included in the server 142a. The built-in grader applications 144 can include a numeric grader application 708 and an expression grader application 710. The submission module 180 can verify that the contents of the submitted programming assignment 702 are in a proper format and include an expected type of content for evaluation by the built-in grader applications 144. For example, in order for the numeric grader application 708 to be able to grade the programming assignment 702, the content of the programming assignment 702 should include a single line list of real numbers separated by a whitespace. In another example, in order for the expression grader application 710 to be able to grade the programming assignment 702, the content of the programming assignment 702 should include one or more specific text strings (e.g., words, phrases or sequences of letters). The submission module 180 can output a verified programming assignment 706 for input to either the numeric grader application 708 or the expression grader application 710 dependent on the type of content included in the programming assignment 702.

The built-in grader 718 can grade the first type of programming assignment by comparing the results of the executed code of the programming assignment included in the verified programming assignment 706 with predetermined correct results for the programming assignment provided by the instructor and stored, for example, in the online course repository 142b in association with the online course.

Figure 8:
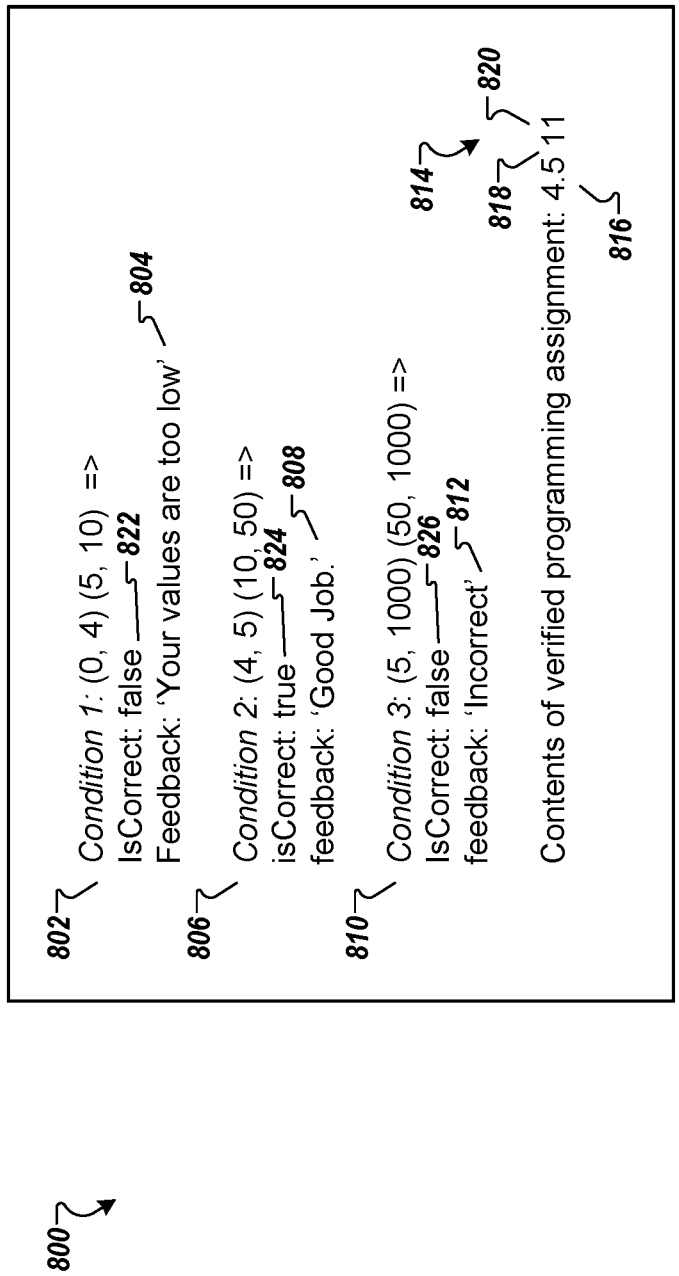
FIG. 8 shows an example of conditional logic that a built-in grader application can use when grading a submitted programming assignment for a student.

FIG. 8 shows an example of conditional logic 800 that a built-in grader application (e.g., the numeric grader application 708) can use when grading a submitted programming assignment (e.g., the programming assignment 702) for a student (e.g., the student 109). Referring to FIG. 7, the numeric grader application 708 receives the verified programming assignment 706 from the submission module 180. The submission module 180 verifies that the submitted programming assignment 702 is compliant with a specified format for the submission of the programming assignment 702. In this example, contents of the verified programming assignment 814 include a first submission 816 and a second submission 820 separated by a whitespace 818, conforming to the specified format for the submission of the programming assignment.

The numeric grader application 708 checks the contents of the verified programming assignment 814 (the first submission 816 and a second submission 820) against a first condition 802. In order for the contents of the verified programming assignment 814 to match the criteria of the first condition 802, the student would input two numbers: a first number (e.g., the first submission 816) being in the interval from zero to four and a second number (e.g., the second submission 820) being in the interval from five to ten. If the criteria of the first condition 802 is met or matched, the submitted programming assignment 702 is marked (graded) as incorrect. First condition status 822 indicates the status of the comparison of the first condition 802 with the contents of the verified programming assignment 814. In addition, in some cases, first feedback 804 can be provided to the student 109.

If the contents of the verified programming assignment 814 do not meet the criteria of the first condition 802, the numeric grader application 708 checks the contents of the verified programming assignment 814 against a second condition 806. In order for the contents of the verified programming assignment 814 to match the criteria of the second condition 806, the student would input two numbers: a first number (e.g., the first submission 816) being in the interval from four to five and a second number (e.g., the second submission 820) being in the interval from ten to fifty. If the criteria of the second condition 806 is met or matched, the submitted programming assignment 702 is marked (graded) as correct. Second condition status 824 indicates the status of the comparison of the second condition 806 with the contents of the verified programming assignment 814. In addition, in some cases, second feedback 808 can be provided to the student 109.

If the contents of the verified programming assignment 814 do not meet the criteria of the second condition 806, the numeric grader application 708 checks the contents of the verified programming assignment 814 against a third condition 810. In order for the contents of the verified programming assignment 814 to match the criteria of the third condition 810, the student would input two numbers: a first number (e.g., the first submission 816) being in the interval from five to one thousand and a second number (e.g., the second submission 820) being in the interval from fifty to one thousand. If the criteria of the third condition 810 is met or matched, the submitted programming assignment 702 is marked (graded) as incorrect. Third condition status 826 indicates the status of the comparison of the third condition 810 with the contents of the verified programming assignment 814. In addition, in some cases, third feedback 812 can be provided to the student 109.

Referring to FIG. 7, the numeric grader application 708 can output a grade 712 for the submitted programming assignment 702. In addition, the numeric grader application 708 can provide feedback to the student along with the grade 712. The built-in grader 718 can provide the grade 712 and the feedback to the student 109 in a user interface for display on the display device 120 included in the computing device 102a.

In addition or in the alternative, the grade 712 and the associated feedback can be provided (sent, downloaded) to a grade management system 716. For example, referring to FIG. 1, the grade management system 716 can be included in the computer system 130. The grade management system 716 can be implemented on a server (e.g., the server 142a or a different server) and can interface with (access) and/or include a student repository (e.g., the student repository 142c). The grade 712 can be stored in association with the student (e.g., the student 109) by the grade management system 716 in a student repository (e.g., the student repository 142c). The student 109 and/or the instructor 111 can access the grades for the student 109 that are stored in the student repository 142c. The access can be allowed based on a successful verification procedure (e.g., entry of a username and/or password). On successful access verification by the student 109, the grade management system 716 can provide (download) the grades for the student 109 to the computing device 102a for display to the student 109 in a user interface on the display device 120. On successful access verification by the instructor 111, the grade management system 716 can provide (download) the grades for the student 109 to the computing device 102b for display to the instructor 111 in a user interface in the display area 124.

The built-in grader applications 144 can include the expression grader application 710. The submission module 180 can verify that the contents of the submitted programming assignment 702 are in a proper format and include an expected type of content (e.g., a text string) for evaluation by the expression grader application 710. For example, in order for the expression grader application 710 to be able to grade the programming assignment 702, the content of the programming assignment 702 should include one or more specific text strings (e.g., words, phrases, or sequence of letters). The submission module 180 can output a verified programming assignment 706 for input to the expression grader application 710.

The built-in grader 718 can grade the first type of programming assignment by comparing the results of the executed code of the programming assignment (e.g., the text strings) included in the verified programming assignment 706 with predetermined correct results (e.g., specific text strings, specified character counts) for the programming assignment provided by the instructor and stored, for example, in the online course repository 142b in association with the online course.

The expression grader application 710 can output a grade 712 for the submitted programming assignment 702. In addition, the expression grader application 710 can provide feedback to the student along with the grade 712. The built-in grader 718 can provide the grade 712 and the feedback to the student 109 in a user interface for display on the display device 120 included in the computing device 102a.

In some implementations, a programming assignment can use a regular expression format. Examples of regular expression formats can include, but are not limited to, JAVA regular expression formats and Perl compatible regular expression (PCRE) formats. In these implementations, a regular expression syntax tester can ensure that the regular expressions (e.g., the text strings submitted by a student in a programming assignment) render as expected. In addition, in a manner similar to the numeric grader application 708, the expression grader application 710 can include conditional logic and criteria that the expression grader application 710 can use when grading a submitted programming assignment (e.g., the programming assignment 702) for a student (e.g., the student 109). For example, each condition can include a single expression tester rule, a correct/incorrect status, and feedback to the student regarding the matched (or unmatched) condition.

In some cases, the student 109 can submit a second type of programming assignment that includes code for execution by a custom grader 720 as the programming assignment 702. The student 109 can provide the programming assignment 702 to the submission module 180 included in the computer system 130 using the network 116. The submission module 180 can verify that the contents of the submitted programming assignment 702 are in a proper format and include an expected type of content for evaluation by a custom grader application 728 included in a custom grader container 746. The grading service 166 can access the course repository 142b to obtain a custom grader container image 147 that can be the basis for the custom grader container 746. The grading service 166 inputs the verified programming assignment 704 into the custom grader container 746.

The custom grader 720 can run (execute) the code included in the verified programming assignment 704 inside of the custom grader container 746 using the custom grader application 728. The custom grader 720 (and specifically the grading service 166) can provide the custom grader container 746 with the verified programming assignment 704 as a container for executing (running) in a cloud computing environment 160 accessible by the server 142a. The custom grader application 728 executes (runs) the verified programming assignment 704 within the constraints of the custom grader container 746.

The custom grader 720 can grade the second type of programming assignment by comparing the results of the executed code of the programming assignment with predetermined correct results for the programming assignment provided by the instructor and stored, for example, in the online course repository 142b in association with the online course.

The cloud computing environment 160 can output a grade 714 for the submitted programming assignment 702 once execution and grading of the verified programming assignment 704 within the custom grader container 746 is completed. In addition, the cloud computing environment 160 can provide feedback to the student along with the grade 714. The cloud computing environment 160 can provide the grade 712 and the feedback to the student 109 in a user interface for display on the display device 120 included in the computing device 102a.

In addition or in the alternative, the grade 714 and the associated feedback can be provided (sent, downloaded) to the grade management system 716. The grade 714 can be stored in association with the student (e.g., the student 109) by the grade management system 716 in a student repository (e.g., the student repository 142c) as described herein.

The output of the programming assignment can include numeric and/or regular expressions for evaluation and grading by the built-in grader applications 144. In some implementations, the output of the programming assignment can include, but is not limited to, an essay, one or more short answers in a particular format, a blueprint, a computer-aided-design (CAD) drawing, and a spreadsheet. Additional built-in grader applications can be included in the built-in grader applications 144 for use in grading one or more of the outputs of the programming assignments.

For example, a text parser grader application can parse the text included in the essay to identify grammatical issues or errors included in the essay. For example, a short answer grader application can parse the one or more short answers provided in a particular format to identify key words that indicate a correct answer. For example, a blueprint grader application can compare the submitted blueprint against a desired blueprint submitted by the instructor to identify similarities and differences between the instructor's blueprint and the student submitted blueprint. For example, a spreadsheet grader application can compare the values included in the cells in the student submitted spreadsheet to values included in the cells in a spreadsheet provided by the instructor, identifying matches between correlated cells as correct answers. As in the case of the built-in grader applications 144 described herein, the output of a grader application can be a grade and feedback about the submitted programming assignment that can be provided to the student. Though the use of built-in grader applications is described, in some or all of the above example programming assignment output a custom grader may be used to grade the programming assignment.

An instructor can use custom grader logic when preparing a custom grader. The custom grader logic can be used to containerize the custom grader for storage as a custom grader container in a course repository. When a programming assignment is submitted that requires the use of a custom grader, a grading service can package the submitted assignment with an image of the custom grader container as containerized code that can be executed or run in a cloud computing environment. Containerizing the execution of the programming assignment can provide many benefits to the instructor and the student while ensuring the integrity and protection of the computing environment (e.g., the cloud computing environment) that runs the containerized code.

In some implementations, a custom grader (e.g., the custom grader container) can be a container image. A container image can provide a self-contained environment for a custom grader application to execute (run) the code included in a programming assignment. The container image can also provide and include resources and files that the custom grader application may use when executing (running) the code in the programming assignment. The resources and files can include, but are not limited to, operating system packages, libraries, source code, support files, system tools, and drivers.

Containerizing the grading of a programming assignment can provide for secure execution and grading of the programming assignment. Referring to FIG. 1, the system 100 can be implemented to provide isolation of individual student submitted programming assignments. For example, the evaluation (execution and grading) of an assignment submitted by a first student should not affect the evaluation (execution and grading) of an assignment submitted by a second student.

The execution (running) of the code included in a programming assignment should not result in malicious activity that could affect the computer system 130 and/or the computing devices 102a-d. For example, the ability of the executed code to enable network activity (e.g., connection to and data transfers using the network 116) can be limited if not altogether eliminated (not allowed). This can prevent any connections to the network (e.g., the Internet) that could, for example, mine bitcoins and/or use the network 116 abusively in order to conduct Denial of Service (DoS) and Distributed Denial of Services (DDoS) attacks. In some situations, malicious activity can include an outside attacker attempting to use the system 100 (e.g., the computer system 130) as a proxy host to launch alternative and/or targeted attacks. In addition, a custom grader container may include test cases and/or data values that may be proprietary and therefore should remain secret.

In order to provide the necessary amount of security needed by the system 100, the system 100 may use one or more techniques and/or tools. The custom grader container image 147 can be used as a basis for the custom grader container 146 that includes a programming assignment as input. The custom grader application 140 included in the custom grader container 146 can execute (run) the programming assignment. The container tool 148 can package the custom grader application 140, the programming assignment, and any resources needed in a virtual container (a containerized custom grader) that can run on the cloud computing environment 160 in isolation. The containerized custom grader can use resource isolation (isolation from a CPU, memory, block I/O, network, etc.) and separate namespaces to isolate the view of the operating system from the custom grader application 140.

Other types and methods for providing security in the system 100 can include the use of mandatory access control to system resources as opposed to discretionary access control. This additional layer of security can be considered host based. The use of a mandatory access control system for mandatory access control to system resources can allow the system 100 to designate which files can be accessed (read and written) by the custom grader application 140 and the code included in the programming assignment from and within a containerized custom grader.

A network-based firewall system can provide network filtering as a layer of security. For example, a network-based firewall system can include firewalls implemented by routers. In another example, a network-based firewall system can include firewalls implemented by a provider of a cloud computing environment. In some implementations, more than one implementation of a network-based firewall system can be used to provide a network-based layer of security.

Iptables can be used to implement a host-based firewall system providing a host-based layer of security. For example, the iptables can be included in the cloud computing environment 160 to filter and limit communication packets sent to the network 116.

The use of file system quotas can be considered an example of a host-based layer of security. For example, to guard against a malicious grader, a quota on the size of the file system will be enforced. If during the execution of the custom grader application 140 when executing the code in the programming application within the containerized custom grader an attempt is made to exceed the file system quota, the custom grader application 140 and the execution of the code included in the programming assignment will be stopped.

Another example of a host-based layer of security can be recycling instances of the containerized custom grader in the cloud computing environment 160 on a periodic basis. For example, if an attacker were to maliciously copy and infiltrate the instance, periodically destroying or throwing away of the instance away can decrease if not eliminate this from occurring. Another example of a host-based layer of security can be the use of security monitoring agents in the system 100.

An example of a network-based layer of security can include logically isolating a part or section of the cloud computing environment 160, which can be provisioned for use by the containerized custom grader. The provisioned logically isolated part of the cloud computing environment 160 can include one or more network based firewalls (security groups), network access control lists (ACLs), and routing table control. Inbound and outbound network access can be limited to only allowed IP address ranges.

Networked-based security can also include the use of security groups. A security group can be a network based firewall that can prevent unauthorized incoming network connections. Each containerized custom grader can be included in a web services account separate from other web services accounts, providing resources use isolation.

A Hypertext Transfer Protocol (HTTP) proxy can perform content filtering. Use of content filtering by an HTTP proxy in combination with the use of a Web Proxy Autodiscovery Protocol (WPAD) can allow only certain amounts and types of network access, providing a level of control to network accesses. Network Address Translation (NAT) can map one or more networks to a single IP address. NAT can be used to filter outbound network traffic from the cloud computing environment 160 and containerized custom grader. Set User ID upon execution (SUID) binaries can control access rights flags for programs executed in the cloud computing environment 160 by code included in the programming assignment and/or custom grader application 140. The use of a secure computing mode (a seccomp) can, for example, sandbox the custom grader application 140 when executing the code included in the programming assignment.

One or more of the types and methods for providing security in the system 100 described herein can be implemented and used along with (in combination with) the use of a containerized custom grader. In addition or in the alternative, one or more types and methods for providing security within (inside of) the containerized custom grader can also be implemented. For example, the custom grader application 140 can execute (run) the code included in the programming assignment in the container as an unprivileged user or a user with minimal access to system resources. SUID binaries for controlling access rights flags for programs executed in the cloud computing environment 160 will not be used inside of the containerized custom grader.

In some implementations, the SUID binaries can be removed from the containerized custom grader. The non-use or lack of SUID binaries eliminates escalation of system privileges from within the containerized custom grader, reducing, and in some cases eliminating, attack potentials involving system calls and other parts of the file system of the plurality of computing devices (e.g., servers 162a-c) included in the cloud computing environment 160. A Unique Identifier (UID) for the containerized custom grader can be remapped so that user IDs included in the containerized custom grader will not correspond to any host IDs. The remapping can minimize a risk of a possible exposing of and exploiting of a kernel included in one or more of the plurality of computing devices (e.g., servers 162a-c) included in the cloud computing environment 160. The containerized custom grader will not have network access. In some cases, if the code included in the programming assignment needs network access in order to execute, limited and controlled network access may be allowed. In some implementations, the containerized custom grader may be allowed limited and/or controlled network access that can be monitored and controlled outside of the containerized custom grader.

One or more of the types and methods for providing additional layers of security around the containerized custom grader can be used in combination with any or all of the types and methods for providing security in the system 100 and in the containerized custom grader described herein.

Figure 9:
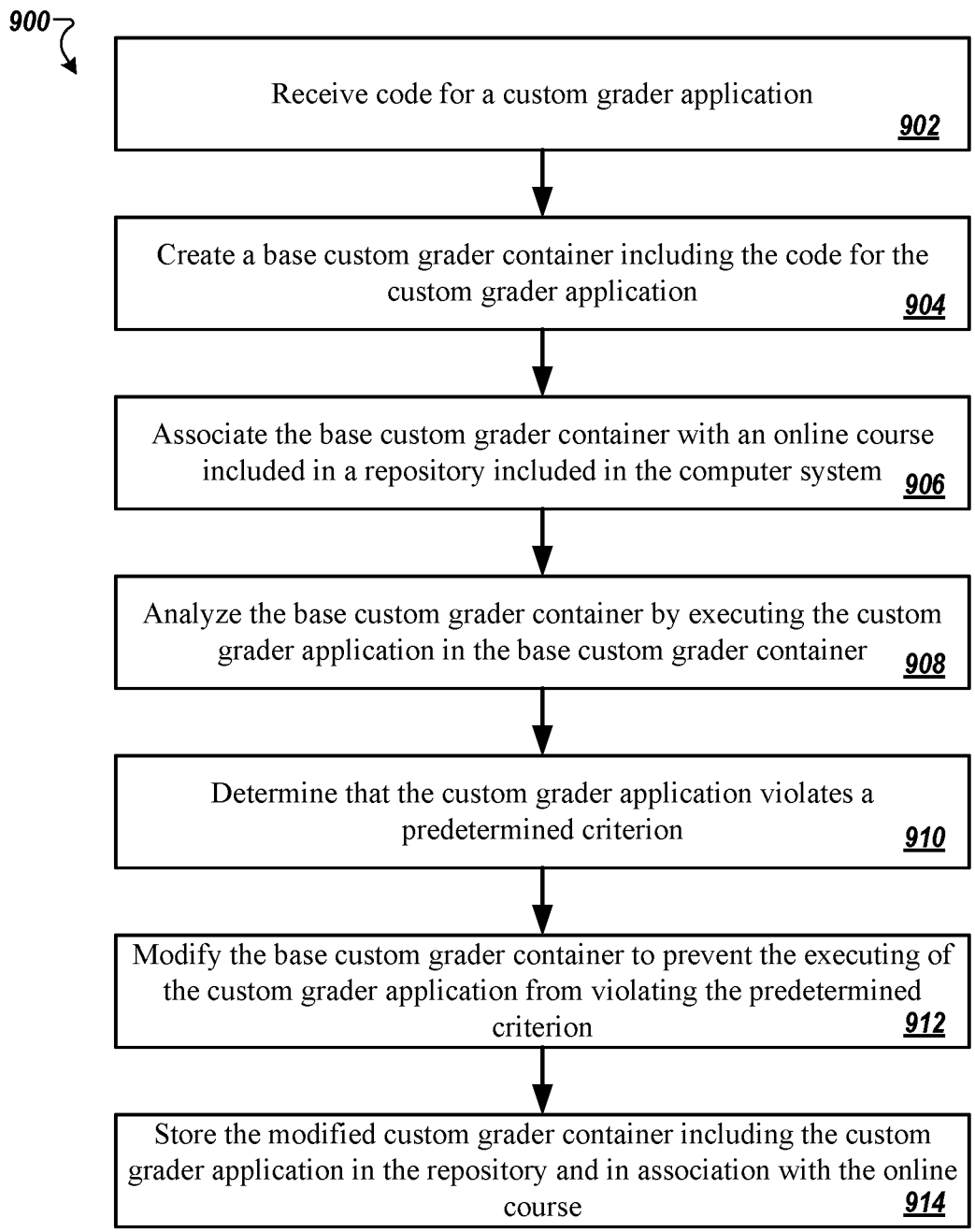
FIG. 9 is a flowchart that illustrates a method for creating and storing a custom grader container image.

FIG. 9 is a flowchart that illustrates a method 900 for creating and storing a custom grader container image. In some implementations, the systems described herein can implement the method 900. For example, the method 900 can be described referring to FIGS. 1-8.

A computer system receives code for a custom grader application (block 902). For example, as described with reference to FIG. 1, the instructor 111 can interact with the web browser UI 184 to create the custom grader application 140. The computer system creates a base custom grader container including the code for the custom grader application (block 904). For example, the instructor 111 can access the container tool 148 in order to incorporate the custom grader application 140 into the custom grader container 146. The custom grader container 146 at this point can be considered the base custom grader container. The instructor 111 can provide the custom grader application 140 in the custom grader container 146 to the server 142a. The base custom grader container can be associated with an online course included in a repository included in the computer system (block 906). For example, the custom grader container 146 can be associated with an online course included in the course repository 142b. The computer system analyzes the base custom grader container by executing the custom grader application in the base custom grader container (block 908). For example, the custom grader container evaluator 158 can evaluate the base custom grader container 146 to determine whether running the custom grader application 140 in the base custom grader container 146 violates any security or operating criteria. It is determined that the custom grader application violates a predetermined criterion (block 910). For example, a security or operating violation is detected. The base custom grader container is modified to prevent the executing of the custom grader application from violating the predetermined criterion (block 912). For example, the custom grader container evaluator 158 can modify and/or fine-tune the base custom grader container 146 to avoid the occurrence of the identified security or operating violation. The modified custom grader container including the custom grader application is stored in the repository and in association with the online course (block 914). For example, the custom grader container 146 which is now a modified custom grader container can be stored in the course repository 142b in the custom grader container image 147 in association with the online course for future use as the basis for a custom grader for a programming assignment for the online course.

Figure 10:
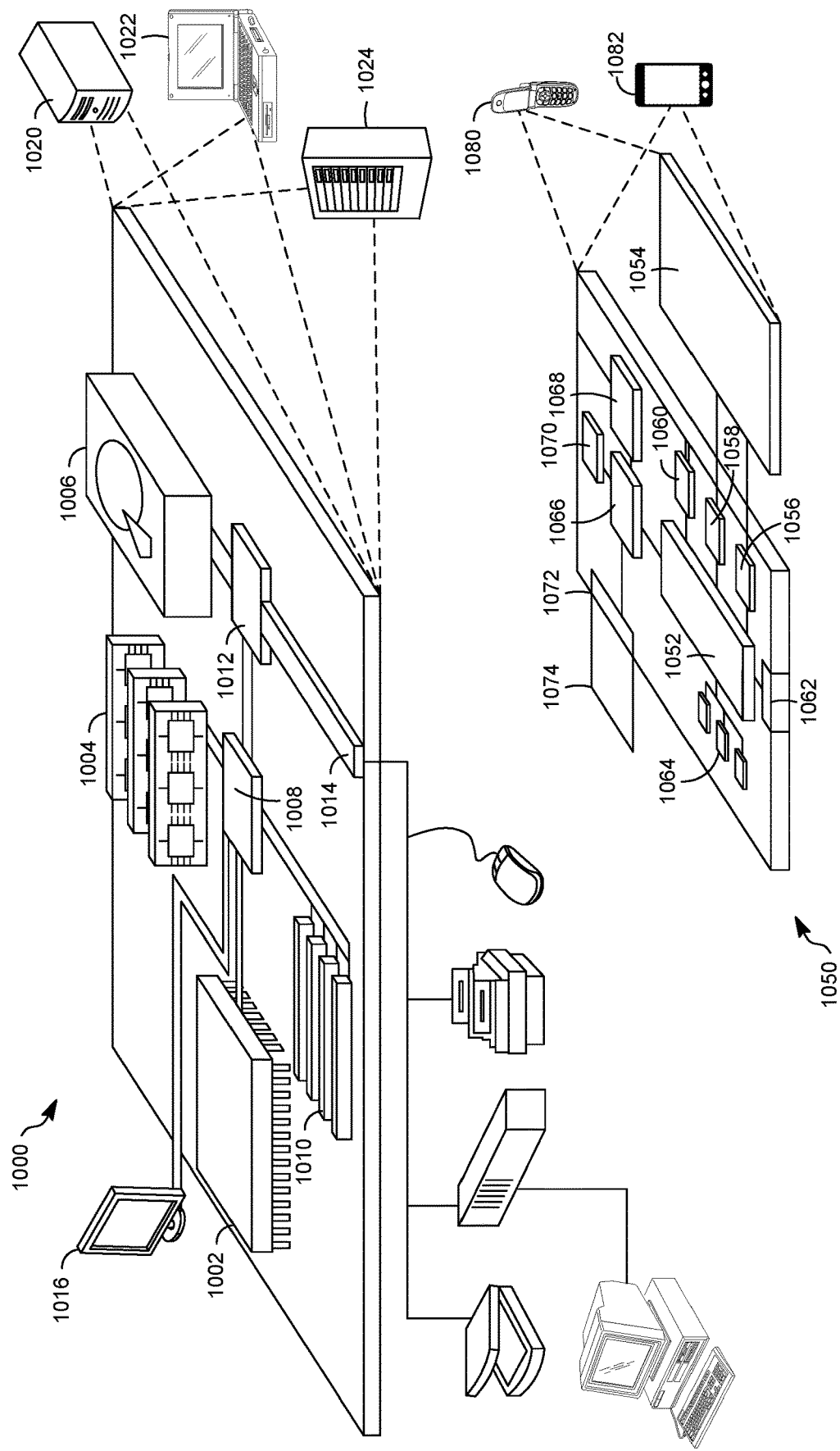
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 10100. It may also be implemented as part of a smart phone 8102, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer system comprising:
 a course repository including:
  a video of an online course;
  an instructor provided output for a programming assignment associated with the online course; and
  a submission script for generating student provided output for the programming assignment; and
 a server including:
  a processor; and
  a memory, the processor executing instructions stored in the memory to implement a submission module configured to:
   receive the student provided output for the programming assignment generated by the submission script; and
   verify the student provided output for the programming assignment; and
  one or more built-in grader applications configured to:
   compare the student provided output for the programming assignment to the instructor provided output for the programming assignment; and
   generate a grade for the programming assignment based on the compare.

2. The computer system of claim 1, wherein the server is configured to provide the submission script to a computing device for execution in a local application included in the computing device, and wherein the student provided output for the programming assignment generated by the submission script is received from the computing device.

3. The computer system of claim 1, wherein verifying the student provided output for the programming assignment includes determining that contents of the student provided output for the programming assignment are in a proper format and include an expected type of content for evaluation by the one or more built-in grader applications.

4. The computer system of claim 1, wherein the one or more built-in grader applications include a numeric grader application and an expression grader application.

5. The computer system of claim 4, wherein the built-in grader application is a numeric grader application; and wherein comparing the student provided output for the programming assignment to the instructor provided output for the programming assignment includes comparing numbers included in the student provided output for the programming assignment with numbers included in the instructor provided output for the programming assignment.

6. The computer system of claim 5, wherein the built-in grader application is an expression grader application, and wherein comparing the student provided output for the programming assignment to the instructor provided output for the programming assignment includes comparing text strings included in the student provided output for the programming assignment with text strings included in the instructor provided output for the programming assignment.

7. The computer system of claim 3, wherein the one or more built-in grader applications includes a custom grader application stored in a custom grader container coupled to the server, the custom grader container including resources and files used in executing the customer grader application.

8. The computer system of claim 7, wherein the server is configured to receive code for the custom grader application for grading the student provided output and to create the custom grader container including the code for the custom grader application, the custom grader container isolating access to system resources and providing a self-contained environment for executing the custom grader application in the computer system.

9. The computer system of claim 8, wherein the instructions stored in the memory, when executed by the processor, further cause the submission module to:
receive the programming assignment for the online course for grading;
access a custom grader container image associated with the online course; use the custom grader container image as a basis for the custom grader container for grading the programming assignment;
input the programming assignment to the custom grader container; execute the programming assignment by the custom grader application included the custom grader container; and
determine a grade for the programming assignment based on an output of an execution of the programming assignment by the custom grader application.

10. A system comprising:
a processor;
a memory, the processor executing instructions stored in the memory to:
receive a student provided output for a programming assignment generated by a submission script; and
verify the student provided output for the programming assignment; and a built-in grader application configured to:
compare the student provided output for the programming assignment to an instructor provided output for the programming assignment; and
generate a grade for the programming assignment based on the compare.

11. The system of claim 10 further comprising:
a course repository including:
an online course, the programming assignment being associated with the online course;
instructor provided output for the programming assignment associated with the online course; and
the submission script for generating the student provided output for the programming assignment.

12. The system of claim 11, wherein the built-in grader application is a custom grader application associated with the online course, and wherein the system further comprises:
a custom grader container including the custom grader application, the custom grader container including resources and files used in executing the built-in grader application.

13. The system of claim 10, wherein the processor executing instructions stored in the memory provides the submission script to a computing device for execution in a local application included in the computing device, and wherein the student provided output for the programming assignment generated by the submission script is received from the computing device.

14. The system of claim 10, wherein the processor executing instructions stored in the memory to verify the student provided output for the programming assignment includes determining that contents of the student provided output for the programming assignment are in a proper format and include an expected type of content for evaluation by the built-in grader application.

15. The system of claim 10, wherein the built-in grader application include a numeric grader application and an expression grader application.

16. A computer program product stored in a non-transitory computer readable medium for receiving a student's output for a programming assignment and comparing the student's output to an instructor's output to generate a grade, comprising:
code for receiving a student provided output for the programming assignment generated by a submission script; and
code for verifying the student provided output for the programming assignment; and
code for executing a grader application to:
compare the student provided output for the programming assignment to an instructor provided output for the programming assignment; and
generate a grade for the programming assignment based on the compare.

17. The computer program product of claim 16 further comprising code for accessing a course repository, the course repository including:
an online course, the programming assignment being associated with the online course;
instructor provided output for the programming assignment associated with the online course; and
the submission script for generating the student provided output for the programming assignment.

18. The computer program product of claim 17, wherein the grader application is a custom grader application associated with the online course, and wherein the computer program product further comprises:
code for creating a custom grader container including the custom grader application, the custom grader container including resources and files used in executing the grader application.

19. The computer program product of claim 17 further comprising:
code for providing the submission script to a computing device for execution in a local application included in the computing device; and
code for receiving the student provided output for the programming assignment generated by the submission script from the computing device.

20. The computer program product of claim 16 wherein the code for executing the grader application includes code for determining that contents of the student provided output for the programming assignment are in a proper format and include an expected type of content for evaluation by the grader application.

\* \* \* \* \*